(12) United States Patent
Ludwig

(10) Patent No.: US 6,694,456 B1
(45) Date of Patent: Feb. 17, 2004

(54) METHOD FOR CHECKING PATH COVERAGE IN SOFTWARE TESTS

(75) Inventor: Ralf-Carsten Ludwig, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/555,995

(22) Filed: Jun. 7, 2000

(30) Foreign Application Priority Data

Dec. 9, 1997 (DE) ................................. 197 54 611

(51) Int. Cl.$^7$ ............................................. G06F 11/00
(52) U.S. Cl. ............................. 714/38; 714/48; 717/132
(58) Field of Search ............................ 714/48, 38, 57; 717/162, 132, 128, 127, 125, 124

(56) References Cited

U.S. PATENT DOCUMENTS

| | | | | |
|---|---|---|---|---|
| 5,339,430 A | * | 8/1994 | Lundin et al. | 709/332 |
| 5,386,568 A | * | 1/1995 | Wold et al. | 717/162 |
| 5,517,629 A | * | 5/1996 | Boland | 714/38 |
| 5,539,907 A | * | 7/1996 | Srivastava et al. | 717/130 |
| 5,732,273 A | * | 3/1998 | Srivastava et al. | 717/128 |
| 5,748,961 A | * | 5/1998 | Hanna et al. | 717/145 |
| 5,872,958 A | * | 2/1999 | Worthington et al. | 703/13 |
| 5,933,640 A | * | 8/1999 | Dion | 717/132 |
| 5,960,004 A | * | 9/1999 | Ramstrom et al. | 370/469 |

OTHER PUBLICATIONS

Chris Caerts, et al., "PDG: A process–level debugger for concurrent programs in the GRAPE parallel programmign environment", Future Generation Computer Systems, vol. 11 (Mar. 1995), No. 2, pp. 199–210.
Jorgensen, Paul C., Software Testing: A Craftman's Approach, 1995, CRC Press, pp. 41–53.*

* cited by examiner

*Primary Examiner*—Robert Beausoliel
*Assistant Examiner*—Christopher S. McCarthy
(74) *Attorney, Agent, or Firm*—Morrison & Foerster LLP

(57) ABSTRACT

A method for the graphic presentation of the results of tests of software programs. The software program to be tested is composed of module building blocks and the software program can be presented in the form of a run graph. A run log was produced in the test of this software program.

A critical precondition of the inventive method is that the software program to be tested can be resolved into individual program modules. The program run can then be simply displayed as a graph in which the individual program modules are connected to one another (by edges) in the run sequence. A test run protocol (trace protocol) is produced when testing the software program, this protocol containing particulars about the test run, i.e. the reactions of the program to be tested to the individual test instances, for example to the software modules (SIB names) that are respectively traversed. This trace protocol is automatically interpreted and the modules and paths that were traversed are then optically marked in the run graph.

4 Claims, 1 Drawing Sheet

METHOD FOR CHECKING PATH COVERAGE IN SOFTWARE TESTS

BACKGROUND OF THE INVENTION

The present invention relates to a method for graphic presentation of the results of tests of software programs, whereby the software program to be tested is composed of module building blocks and the software program can be presented in the form of a flowchart, and whereby a run protocol was produced in the test of this software program.

The development of software from existing software modules is preferred, when possible. Many sources of error are thereby avoided, since the individual, prefabricated software modules are already present in tested form and, thus, only the data flow and the correct operation of the interfaces of the prefabricated interfaces need be checked. A further simplification in the development is the employment of a graphic display that represents the data flow on the basis of a graph (for example, of a tree).

One possible application of this simplified software development is the development of services for an intelligent network (IN). An IN offers the possibility of offering a customer of telecommunication services further value-added services in addition to the voice and data communication. What are thereby involved, for example, are area-wide, uniform numbers, modified cost regulations such as "free phone" or "premium service", the recording of messages, etc.

These services must be adapted to the needs of the service vendor and the service user; they can be compiled in a simple way from individual, standardized software modules, which are referred to as SIBs (Service Independent Building Blocks).

The development of the services can take on an even simpler form on the basis of a graphic programming display (SD, Service Definition). The various modules (SIB) are thereby presented as symbols (icons) that can be connected in a tree-like or networked structure in a graphic. This structure can then be automatically translated into the runnable program (FSL, Flexible Service Logic), as which it is then to run in a suitable network element in the telephone or data network.

Before the new service can be applied, however, a test of the new service software (service logic) must be implemented. This occurs with specific testing methods that simulate various applications and co-log the result of the test run in what is referred to as a trace. The programmer must then manually check whether the result of the test is correct and whether the test checks the complete software.

Another possibility of error searching is comparison to the graph that represents the service logic. Whether all alternatives and, thus, all paths of the graph have been covered with the test can be more easily checked. This can be laboriously replicated on the basis of the representation of the service graph on the graphic service of the service definition (SD) tool.

A printout of the service graph is also often possible; this, however, can cover several sheets of paper, this in turn making the entire thing unsurveyable.

SUMMARY OF THE INVENTION

An object of the present invention is to provide a method with which the test of software can be more simply monitored. In particular, the inventive method provides a simple check to see whether the software to be tested has been covered as completely as possible by the test.

This object is inventively achieved in accordance with the present invention in a method for graphic presentation of results of tests of software programs for a realization of telecommunication services, said method comprising the steps of:

providing a software program for testing, said software program comprising a number of module building blocks;

presenting said software program in a form of a run graph, said run graph graphically presenting said module building blocks appropriately connected by connecting lines;

producing a run protocol during a test of said software program;

marking all test results of said test in a presentation of said run graph; and marking those module building blocks and connecting lines of said run graph that were not traversed during said test.

A critical pre-condition of the inventive method is that the software program to be tested can be resolved into individual program modules. The program execution can then be simply presented as a graph wherein the individual program modules are connected to one another (by edges) in the run sequence. The graph can thereby assume a tree-like structure.

The presentation of this program run (referred to below as well as FSL, Flexible Service Logic) can be arbitrarily expanded, for instance by additional labels of the individual program modules (for example, with the name) and of the individual connections/edges (for example, with transfer parameters or with the result of a decision query).

A test run protocol (trace protocol) is produced in the test of the software program, this containing particulars about the course of the test, i.e. the reactions of the program to be tested to the individual test instances, for example to the respectively run software modules (SIB name).

Inventively, this trace protocol should now be automatically interpreted, and the modules and paths that have been run should be optically marked in the run graph.

Whether the tested program runs through the correct modules and thereby behaves correctly, i.e. arrives at the correct result, can thus not only be traced at the picture screen. On the basis of suitable markings, moreover, a check can be carried out as to whether the implemented test also completely tests the software program, i.e. all possible paths are run (path coverage).

The proposed method considerably simplifies the testing of newly created software programs, particularly for unexperienced testers or persons who are not as familiar with the program execution (for example, given separation of development and testing).

The laborious, manual interpretation of the test logs with the comparison of the trace log and the program execution that was previously necessary can be eliminated.

In an embodiment, there is provided a method for graphic presentation of results of tests of software programs for a realization of telecommunication services, said method comprising the steps of:

providing a software program for testing, said software program comprising a number of module building blocks;

presenting said software program in a form of a run graph, said run graph graphically presenting said module building blocks appropriately connected by connecting lines;

producing a run protocol during a test of said software program;

marking all test results of said test in a presentation of said run graph;

comparing said test results to an anticipated test result;

marking those module building blocks and connecting lines of said run graph that were incorrectly traversed during said test during said test; and marking those module building blocks and connecting lines of said run graph that were not traversed during said test.

In an embodiment, a program path run during said test is marked on said run graph by graphically emphasizing connecting lines between module building blocks that were traversed during said test.

The present inventive method proves especially beneficial when the software to be tested was previously defined with a graphic development tool (SD) in the form of a run graph. For example, the individual program modules can thereby be arranged in the form of symbols (icons) and can be connected by module calls (arrows, directed edges of the graph). The result is a FSL source code that is imaged onto a runnable program with a translator.

This run graph can already be utilized for manual interpretation of the trace log in that the program was replicated on the basis of a printout of this graph or at the development display. The testing outlay is thereby in turn of the same extent in every renewed test run (regression test).

One possibility of marking is chromatic emphasis of the individual, used program modules and the paths run for that purpose (branches, edges of the graph). A complete test coverage is achieved when all edges of the program run data are colored, i.e. all program modules and all paths between the program modules were traversed. The application of various types of color (for instance, each test instance that is run is marked with a different color or the frequency of occurrence with which a specific path was run or the distinction between anticipated, i.e. correct, and faulty running of the run graph during the test) is at the discretion of the person skilled in the art. In addition to a different color type, a different line type (broken, bold . . . ) can identify the path employed.

This also enables the test implementation when no chromatic processing surface is available.

A test that is simple to implement and that is correct is extremely important particularly in the development of services for an intelligent network that has already been set forth. Once it was activated in the telephone or data network, the service logic must function extremely correctly, since this can otherwise harbor unpredictable effects and side effects on the entire network.

Since a redesign of services is very simple on the basis of the graphic design display, an equivalent display of a test tool should make this just as simple.

These and other features of the invention(s) will become clearer with reference to the following detailed description of the presently preferred embodiments and accompanied drawings.

DETAILED DESCRIPTION OF THE PRESENTLY PREFERRED EMBODIMENTS

Figure 1:
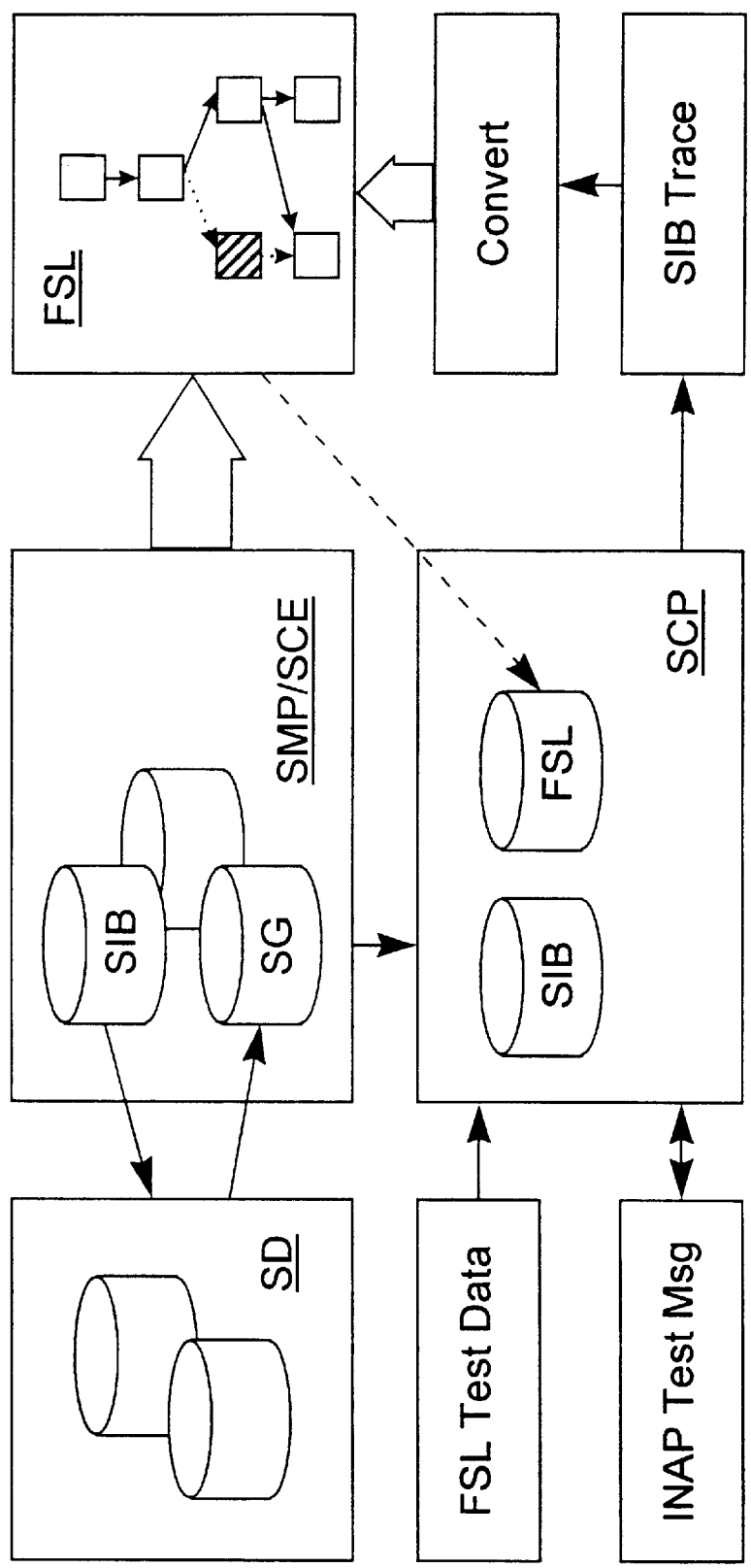
FIG. 1 shows the course from the development of a display up to the test evaluation with a run graph in accordance with the present invention.

The service developer (service designer) designs a new service with the assistance of a graphic development tool (SD, Service Definition). This is essentially composed of a library of program modules that are already pre-defined (service independent building blocks, SIB). This occurs in an important element of the intelligent network, what is referred to as the service management point (SMP) or in the service creation environment (SCE) provided therefor that offers a development display that is simple to apply. A number of service SD can access this development environment.

The program modules are connected to form a service logic graph SG (or a program run graph as well). In order to obtain a functioning service, further definitions must be made; these, however, are not the subject matter of the present invention.

The service graph (FSL, Flexible Service Logic) is presented on the development display during the definition phase. A service logic program can then be automatically generated from this graph, this program then having to be tested for its functionality. The service logic program is stored on the executing network element (SCP, Service Control Point). Further test data are required for the implementation of the test (FSL test data, INAP Test Msg). The test is run with the assistance of a mechanism that is already known and a test protocol (SIB trace) is written.

In the inventive solution, this test protocol is automatically interpreted only with a conversion function (convert) and is compared to the appertaining service graph. The SIBs that are run, for example, are identified on the basis of the co-logged SIB-ID and can thus be marked in the graph in a suitable way. For instance, the property parameters of the SIB connecting lines (branches) that are run can be set to a color value or line type in the FSL source text.

One possible path was not run in the example shown in the figure, illustrated by the dot-dashed connecting lines. One program module was thereby not reached, this having been marked here by the hatching.

Although modifications and changes may be suggested by those of ordinary skill in the art, it is the intention of the inventors to embody within the patent warranted hereon all changes and modifications as reasonably and properly come within the scope of their contribution to the art.

List of abbreviations

FSL Flexible Service Logic
INAP Intelligent Network Application Part
SCE service Creation Environment
SD Service Definition
SG Service Graphs
SIB Service Independent Building Blocks
SMP Service Management Point

What is claimed is:

1. A method for graphic presentation of results of tests of software programs for a realization of telecommunication services, said method comprising the steps of:

providing a software program for testing, said software program comprising a number of module building blocks;

presenting said software program in a form of a run graph, said run graph graphically presenting said module building blocks appropriately connected by connecting lines;

producing a run protocol during a test of said software program;

marking all test results of said test in a presentation of said run graph; and marking those module building blocks and connecting lines of said run graph that were not traversed during said test.

2. The method according to claim 1, further comprising the step of:

marking a program path run during said test on said run graph by graphically emphasizing connecting lines between module building blocks that were traversed during said test.

3. A method for graphic presentation of results of test of software programs for a realization of telecommunication services, said method comprising the steps of:

providing a software program for testing, said software program comprising a number of module building blocks;

presenting said software program in a form of a run graph, said run graph graphically presenting said module building blocks appropriately connected by connecting lines;

producing a run protocol during a test of said software program;

making all test results of said test in a presentation of said run graph;

comparing said test results to an anticipated test result;

making those module building blocks and connecting lines of said run graph that were incorrectly traversed during said test; and making those module building blocks and connecting lines of said run graph that were not traversed during said test.

4. The method according to claim 3, further comprising the step of:

marking a program path run during said test on said run graph by graphically emphasizing connecting lines between module building blocks that were traversed during said test.

* * * * *